United States Patent

[11] 3,572,645

[72] Inventor James T. Matsuoka
Brecksville, Ohio
[21] Appl. No. 773,928
[22] Filed Nov. 6, 1968
[45] Patented Mar. 30, 1971
[73] Assignee Intercole Automation, Inc.
Cleveland, Ohio

[54] MIXING MACHINE
7 Claims, 7 Drawing Figs.
[52] U.S. Cl. .................................................. 259/21
[51] Int. Cl. .................................................. B01f 7/02
[50] Field of Search.......................................... 259/21, 25,
26, 6, 9, 10, 110, 109; 146/192, 182.2

[56] References Cited
UNITED STATES PATENTS
2,027,281 1/1936 Lista............................ 146/182.2

2,215,976 9/1940 Robinson ..................... 259/21X
2,295,362 9/1942 Schnuck....................... 259/9X Primary Examiner—Robert W. Jenkins
Attorney—Watts, Hoffman, Fisher & Heinke ABSTRACT: An apparatus for mixing rubbers, elastomers, plastics, and similar material, preferably of the internal mixer type, such as Banbury type mixer, having frame structure forming a mixing chamber, rotors within the mixing chamber for mixing materials therein, a material charging hopper mounted on the frame structure above the mixing chamber and having a charging conduit communicating with the mixing chamber and a floating weight or member movable for applying pressure on the material to be mixed. The floating weight member and interior of the charging conduit include structure to vent gases from the mixing chamber when the floating weight is in a lower position adjacent the mixing chamber.

Patented March 30, 1971

INVENTOR.
JAMES T. MATSUOKA
BY
Watts, Hoffmann, Fisher & Heinke
ATTORNEYS.

MIXING MACHINE

BACKGROUND OF THE INVENTION

1. Field of the Invention

This invention relates to enclosed or internal type mixers in which rubber, plastic and similar types of materials are mixed, and to novel and improved means for venting gases from the mixer.

2. Description of the Prior Art

Typical prior apparatus of the character referred to includes structure defining a mixing chamber to which material is introduced through a charging conduit thereabove. A pressure ram or floating weight is vertically movable in the charging conduit for applying pressure on the mass or batch of material within the mixing chamber while it is being worked upon and mixed by power driven rotors. During mixing of the material, considerable fluid pressure may develop in the mixing chamber; for example, steam may be developed as moisture-containing materials are elevated in temperature during mixing. Venting to relieve high pressures in the mixing chamber has in the past been carried out with various valve means or conduits, but the prior art constructions have not proved to be entirely satisfactory.

SUMMARY OF THE INVENTION

The present invention relates to apparatus for mixing rubbers, elastomers, plastics and similar material, that includes frame structure forming a mixing chamber, a charging hopper above the mixing chamber having an outlet or charging conduit communicating with an upper charging opening in the mixing chamber, rotors in the chamber for mixing materials therein, a floating weight or ram member in the charging conduit that can be moved upward out the charging conduit when materials are introduced to the mixer and which is thereafter biased towards the mixing chamber to close the charging opening and apply pressure to the material being mixed, and means for venting the mixing chamber through the charging conduit. The floating weight or ram member is connected to the piston of a reciprocating-type fluid pressure motor located above the charging hopper. The floating weight or member and charging conduit are constructed to vent gases from the mixing chamber when the floating weight is in a lower position in the charging conduit.

It is an object of the present invention to provide a novel and improved mixer apparatus of the character referred to in which the construction and arrangement of the charging conduit and floating weight or member expedites the mixing operation.

It is another object of this invention to provide a novel and improved mixer of the type referred to having a ram-controlled vent that automatically permits the escape of gases from the mixing chamber to the charging conduit when the ram or floating weight is in a lowermost position substantially flush with the mixing chamber walls where it closes the charging entrance to the mixing chamber.

It is another object of the present invention to provide a mixing apparatus or machine of the character referred to having a weight or member vertically reciprocable in the charging conduit, one of which is provided with a slot and the other of which is provided with a projection to be received in the slot, constructed and arranged to vent gases from the mixing chamber and through the charging conduit for predetermined positions of the removable member in the charging conduit.

It is another object of this invention to provide a novel and improved mixer of the type referred to in which a vertically extending rib or platelike projection extends from an inside surface of the charging conduit, a recessed portion or groove in a vertical surface of the floating weight receives the projection during a portion of the travel of the weight in the conduit, during which portion of travel the weight seals the charging conduit and hence the mixing chamber, and in which the lower terminus of the projection is above the vertical surface of the weight in which the groove is formed when the weight is in a lower position adjacent the top of the mixing chamber so that the chamber is vented to the charging conduit when the weight is in said lowered position.

The invention resides in certain constructions and arrangements of parts and further objects and advantages will become apparent from the following description of the preferred embodiment and the accompanying drawings forming a part of this specification, and in which.

DESCRIPTION OF THE PREFERRED EMBODIMENT

Figure 1:
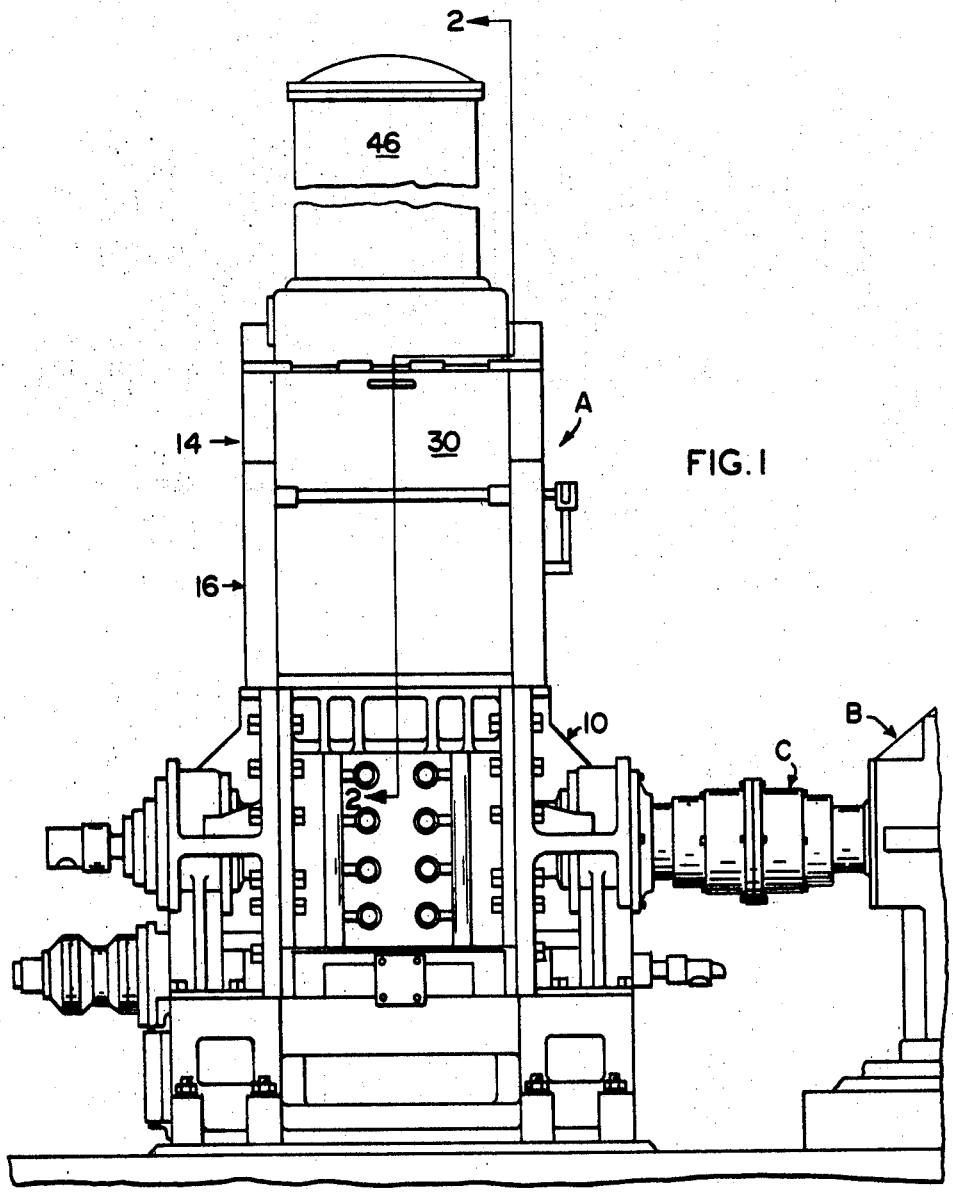
FIG. 1 is a front elevational view of a mixer machine embodying the present invention.
Figure 3:
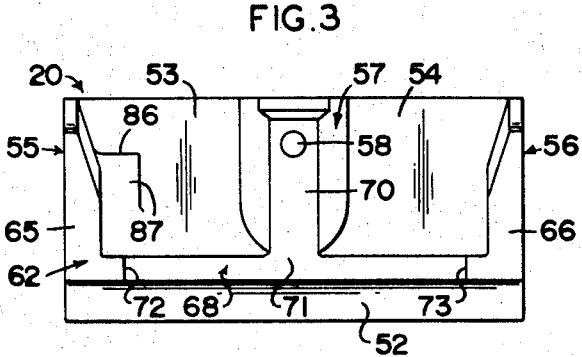
FIG. 3 is a front elevational view of the floating weight as seen in the direction of the arrows 3–3 in FIG. 2.

A mixing machine A of the internal intensive mixing type and embodying the present invention is shown in the accompanying drawings along with a drive unit B. The mixing machine A includes frame structure 10 defining an inner mixing chamber 12 of the double cylindrical type in which material such a rubber, elastomer, plastic and the like can be mixed. The mixer A includes a charging hopper 14 and a charging conduit 16 above the mixing chamber 12 and communicating with a charging opening 17 in the top of the chamber. A pair of mixing rotors 18 and 19 are supported in the frame structure 10 for rotation within the mixing chamber 12. Shafts of the rotors extend from the frame and are connected by couplings C to the drive unit B.

A pressure ram or floating weight member 20 serves as a closure for the charging opening 17 and is vertically slideable in the conduit 16. When the ram or weight is raised to an upper position in the charging hopper 14, as shown in solid line in FIG. 2, material to be mixed can be introduced to the mixing chamber 12 through the charging hopper 14 and conduit 16.

The charging conduit 16 includes a lower section 25 integral with the frame structure 10 and which defines the opening 17 into the mixing chamber 12, and an upper section 26 which is a continuation of and is mounted on the lower section 25. The charging hopper 14 is supported on the upper section 26 and includes a hopper door 30 and a loading opening 32 for admitting the material to be mixed to the charging hopper 14 and ultimately to the mixing chamber 12.

The floating weight or ram member 20 is connected to the lower end of a piston rod 44, the upper end of which is connected to a piston within a fluid cylinder 46 mounted on the top of the hopper 14. With this arrangement, pressure introduced in the cylinder 46 is utilized for moving the floating weight 20 upward adjacent the loading opening 32 and downward through the charging conduit 16 to the opening 17 of the mixing chamber. Downward movement of the floating weight 20 in the charging conduit applies pressure to material being charged into the chamber and maintains pressure until the weight reaches its lowest position. Typically, the position of the weight may fluctuate in the charging conduit due to the mixing action of the rotors. Pressure applied by the weight can be relieved by reducing cylinder pressure or by permitting the weight to operate by gravity.

Figure 2:
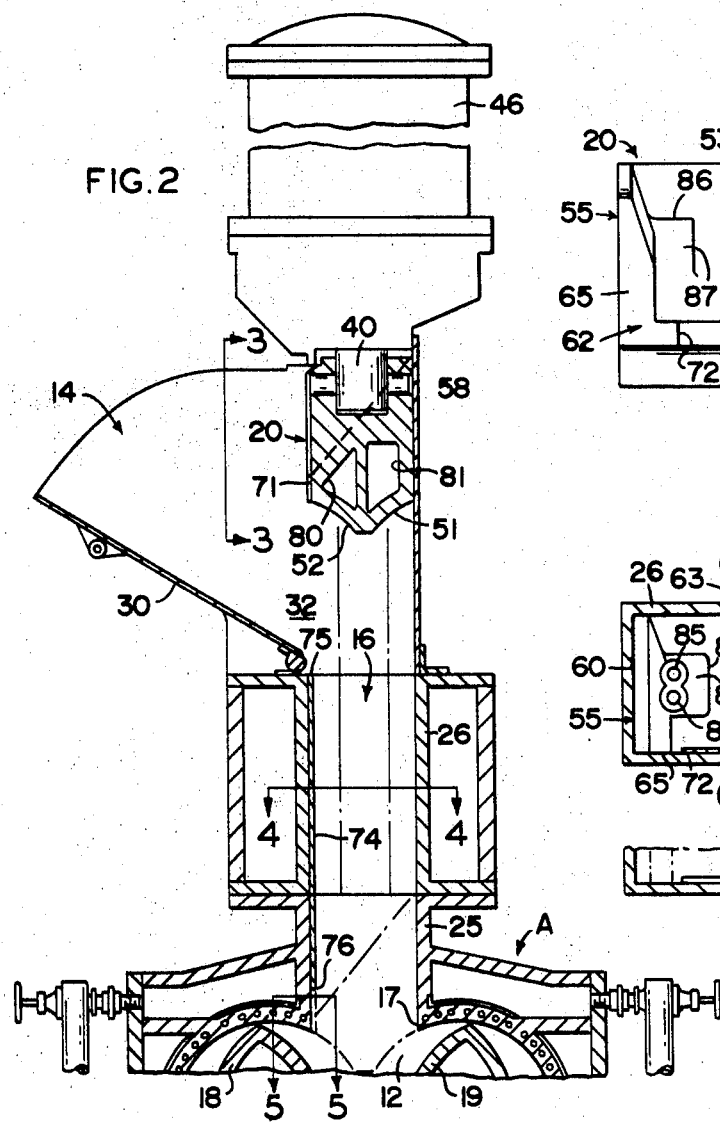
FIG. 2 is a fragmentary, enlarged sectional view of a portion of the mixing machine shown in FIG. 1, taken approximately along the line 2–2.

Considering the floating weight 20 in greater detail, the weight is provided on its lower side with a pair of concave, generally cylindrical lower surfaces 50 and 51 converging toward one another. The surfaces 50 and 51 are oriented symmetrically to be continuations of the mixing chamber wall surfaces when the weight 22 is at its lowest position, indicated in phantom in FIG. 2. Front portions of the weight 20 are relieved to provide a pair of spaced, downwardly sloping surfaces 53 and 54. A pair of spaced, upwardly extending end portions 55 and 56 project beyond the sloping surfaces 53 and 54 at opposite ends of the weight 20. An upwardly extending center portion 57 is provided between the sloping surfaces 53 and 54. A transverse connecting pin 58 is received in the center portion and connects the weight to the piston rod 40, as shown in FIG. 2.

The floating weight is dimensioned to slidably engage interior surfaces of the conduit 16 and to obstruct the passageway to the mixing chamber provided by the conduit. In the embodiment shown, the weight includes planar parallel end surfaces 60, 61, a front surface 62 and a planar rear surface 63 in sliding engagement with the conduit. One side, preferably the front, is constructed to provide a recess to facilitate venting the mixing chamber when the weight is in a selected position within the conduit 16. While a surface other than the front could be provided with the recess, the sloping upper surfaces 53, 54 minimize the dimension of the recess in the vertical direction, when located in the front side. As shown, this vertical front side has two planar surface portions 65, 66 in a single plane at opposite sides of a recessed surface portion 68. The recessed portion has a planar surface comprised of an upwardly extending section 70 and a transversely extending section 71 that terminates in two shoulders 72, 73 which join the surface portions 65, 66. The shoulders extend vertically and the recess is constructed to receive a rectangular-shaped projection from a wall portion of the conduit 16 that otherwise is in contact with the surfaces 65, 66.

Figure 4:
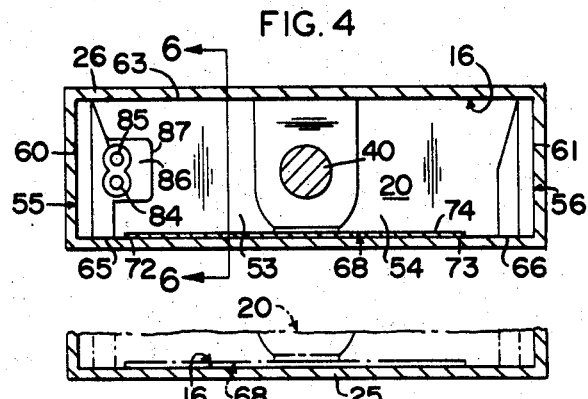
FIG. 4 is a sectional view along the line 4–4 in FIG. 2, taken with the floating weight in a lowered position.
Figure 5:
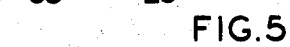
FIG. 5 is a fragmentary sectional view taken along the line 5–5 in FIG. 2.

A vertically elongated, shallow, relatively wide, projection 74 extends from an interior wall portion of the charging conduit 16, opposite the front of the weight 20. The projection 74 has an upper end 75 near the loading opening 32 and a lower end 76 located a short distance above the lower end of the charging conduit 16. The depth and width of the projection 74 are such that projection is closely and slidable received in the recessed portion 68 of the weight when the floating weight is within the conduit 16 and vertically located between the upper and lower ends 75, 76 of the projection. At the same time, the front surfaces 65 and 66 of the weight and also the side and rear surfaces 60, 61, 63 engage the adjacent interior surface of the conduit, providing a peripheral sealing relationship. This sealing relationship is maintained except when the surface portion 71 of the weight is located beneath the lower end 76 of the projection 74. When the floating weight 20 is in its lower position, as shown in phantom in FIG. 2 and in detail in FIG. 6, a position in which the lower surfaces 50, 51 of the weight in part form upper surfaces of the chamber 12, the lower end 76 of the projection 74 is above the surface portion 71 of the weight, typically a distance of about 3 inches. This establishes a passageway through the recessed portion of the weight, from the mixing chamber 14 to the conduit 16 above the weight, which permits gases from within the chamber to escape during the mixing operation when the ram or floating weight is in a lowered position. In higher positions of the weight, as when material is being forced downward in the conduit by the weight, the passageway through the recessed portion 48 is blocked by the projection 74. Compare FIGS. 4 and 5.

Figure 6:
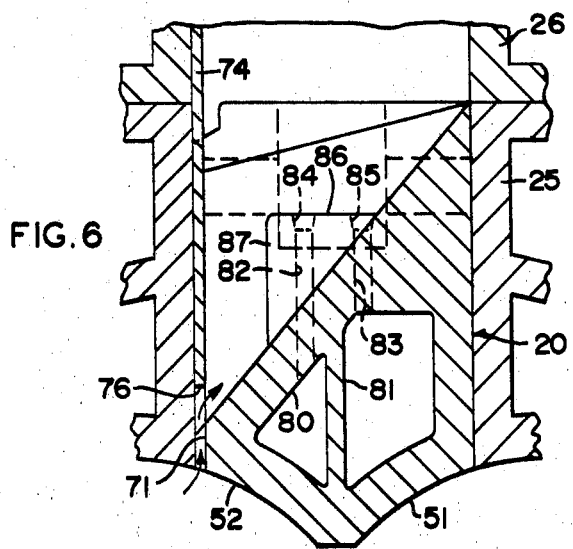
FIG. 6 is a fragmentary sectional view of the machine as taken along the line 6–6 of FIG. 4, showing the floating weight in a lowered position.
Figure 7:
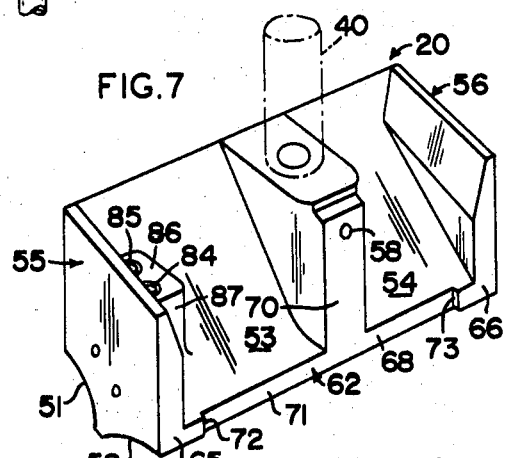
FIG. 7 is a diagrammatic perspective view of the floating weight.

To facilitate temperature control or the floating weight 20, chambers 80, 81 for the circulation of heat exchange fluid extend across the weight member, as shown in FIG. 6. Internal conduits 82, 83 extend from these chambers to ports 84, 85 in an upwardly facing horizontal surface 86 of a boss 87. These ports are conventionally connected to fluid supply and exhaust conduits that extend upward through the charging conduit 16 and which are carried in vertical movement by the weight.

In operation, the ram or weight member 20 is raised above the opening to the hopper 14 by the cylinder 46 and material to be mixed is charged into the mixing chamber 12 through the loading opening 32, the conduit 16, and the charging opening 17. The loading door 30 of the hopper is then closed and the fluid cylinder 46 is actuated to move the floating weight 20 downward through the conduit 16 to apply a pressure upon the material. As the floating weight 20 proceeds downwardly through the conduit 16, there is no substantial opening through which gases or material in the mixing chamber 12 or charging conduit can escape, and the charged material is compressed into the chamber. As mixing occurs and the floating weight 20 proceeds downward through the conduit 16 toward its lower position, the lower surface portion 71 moves below the lower end 76 of the projection 74. Thus, in the lowered position of the weight or ram, gases may pass upwardly through the recessed portion 68, as diagrammatically indicated by the arrows in FIG. 6, over the sloping surfaces 53 and 54, upwardly through the conduit 16, and outwardly through an opening (not shown) in the hopper 14. Typically, this lower position of the weight or ram is reached when the material has become heated, softened and substantially mixed, at which time gases or vapors driven off by the heat require venting. The venting is automatic with this construction and arrangement. In the event any product from the mixing chamber is forced upward into the passageway formed by the recessed portion 68, the large size and short length of the passageway and the lack of obstructions above the recess 68 assures that the material will merely move through the passageway and be received above the sloping surface of the floating weight, and will not block or otherwise obstruct the subsequent venting of gases from the mixing chamber. In addition, a retraction of the weight to an upper position will cause any such material to fall back through the charging conduit to the mixing chamber.

From the above detailed description, it will be apparent that this invention has provided a novel and improved mixing machine in which gases from the mixing chamber are automatically vented past the floating weight or ram used to apply pressure to the mixing material, when the weight is in a lowermost position where it closes the charging entrance to the mixing chamber.

While a preferred embodiment of the present invention has been described in detail, it will be understood that various modifications and alterations may be made therein without departing from the spirit and scope of the invention as set forth in the appended claims.

I claim:

1. In a mixing apparatus, a frame defining a mixing chamber, a charging conduit communicating with said chamber, a movable ram slideable in said conduit, an elongated projection along an interior surface of said conduit, and a recess in a surface of said ram that faces said interior surface to slidably receive said projection, said recess extending the length of said ram surface in the direction of ram movement and said projection having one end adjacent to said chamber but spaced therefrom a distance greater than the length of said recess, whereby the ram can be moved toward said chamber to a position where the projection is not received in said recess.

2. In apparatus for mixing rubber, plastic, and the like, a frame defining a mixing chamber having a charging opening, a charging conduit communicating with said charging opening, a ram member slideable within said charging conduit and in generally sealing relationship therewith, means for sliding said ram member is said conduit, a recess in a surface of said ram member slidable along a surface of said conduit, and a member projecting from said surface of said conduit along a portion of the conduit length, extending in the direction of sliding movement of said ram and received in said recess along a portion of the distance said ram member moves in said conduit, said projecting member terminating at a location spaced from said charging opening a distance greater than the dimension in the corresponding direction of said surface of said ram member in which the projecting member is received, whereby said recess provides a passageway past the ram member from the mixing chamber to the charging conduit beyond the ram only when the ram member is positioned in said charging opening.

3. In a mixing apparatus for rubber, plastic and the like, a frame defining a mixing chamber; a charging conduit extending vertically above said mixing chamber and in communication with a top charging opening of the mixing chamber; a movable member shorter than said conduit, slidable vertically therein in generally sealing relationship therewith along a major portion of the conduit length, and movable to a lower position at said top charging opening; a vertically elongated projection along an interior surface of said conduit; and a recess in a surface of said member that slides in contact with the conduit, which recess extends the vertical height of said surface and is dimensioned to closely and slideably receive said projection; said projection having a lower end spaced above said mixing chamber a distance greater than the vertical height of said recess when said movable member is in said lower position, whereby a venting passageway is established through said conduit when said member is in said lower position.

4. In a mixing apparatus: a frame defining a mixing chamber and a charging opening; a charging conduit communicating with said charging opening; and a floating weight slideable in said conduit and positionable at said charging opening; one of said weight and conduit having a slot extending in the direction in which the weight is slidable and the other having a projection closely interfitting with the slot and blocking the cross-sectional area thereof during movement of said weight along a portion of said conduit, said slot forming a passageway past said weight unblocked by said projection when said weight is positioned at said charging opening.

5. In a mixing apparatus: a frame defining a mixing chamber and a charging opening; structure defining a charging conduit communicating with said charging opening; a movable ram closely fitted and slidable within said conduit; a passageway formed by said ram and conduit through which gases can pass in said conduit from one side of the ram to the other; and means cooperable between said ram and said conduit to prevent passage of gases past said ram through said passageway at positions of said ram in said conduit spaced from said charging opening, and to automatically open said passageway and vent said mixing chamber through said conduit when said ram is positioned in said charging opening.

6. In a mixing apparatus: a frame defining a mixing chamber and a charging opening; structure defining a charging conduit extending from and communicating with said charging opening; a movable ram or weight closely fitted and slidable in said conduit; a passageway between said ram and said conduit-defining structure through which gases can pass in said conduit from one side of the ram to the other when said ram is positioned at said charging opening, and means cooperable between said ram and conduit-defining structure preventing the passage of gases past said ram at positions of said ram in said conduit spaced from said charging opening.

7. In a mixing apparatus: a frame defining a mixing chamber and a charging opening; structure defining a charging conduit communicating with said charging opening; a movable ram or weight closely fitted and slideable in said conduit in generally sealing relationship with said conduit-defining structure; and means responsive to a positioning of said ram at said charging opening for providing a passageway for gases from said mixing chamber past said ram.